(12) United States Patent
Stewart

(10) Patent No.: US 8,832,167 B2
(45) Date of Patent: *Sep. 9, 2014

(54) RANDOM NUMBER GENERATOR

(75) Inventor: Norman Stewart, Toronto (CA)

(73) Assignee: Vixs Systems, Inc., Toronto, Ontario (CA)

( * ) Notice: Subject to any disclaimer, the term of this patent is extended or adjusted under 35 U.S.C. 154(b) by 508 days.

This patent is subject to a terminal disclaimer.

(21) Appl. No.: 13/187,763

(22) Filed: Jul. 21, 2011

(65) Prior Publication Data

US 2013/0024490 A1  Jan. 24, 2013

(51) Int. Cl.
*G06F 7/58* (2006.01)

(52) U.S. Cl.
CPC ........................................ *G06F 7/58* (2013.01)
USPC ........................................................ 708/252

(58) Field of Classification Search
None
See application file for complete search history.

(56) References Cited

U.S. PATENT DOCUMENTS

| | | | | |
|---|---|---|---|---|
| 6,954,770 | B1 * | 10/2005 | Carlson et al. | 708/251 |
| 2007/0047622 | A1 * | 3/2007 | Stern | 375/130 |
| 2007/0174374 | A1 * | 7/2007 | Inoha | 708/252 |
| 2013/0022203 | A1 * | 1/2013 | Stewart | 380/278 |
| 2013/0024490 | A1 * | 1/2013 | Stewart | 708/251 |

OTHER PUBLICATIONS

"Alternating Step Generator," printed from <<http://en.wikipedia.org/wiki/Alternating_step_generator>>on Jun. 9, 2011, 3 pages.

* cited by examiner

*Primary Examiner* — David H Malzahn

(57) ABSTRACT

A device includes a plurality of linear feedback shift registers, a counter having a counter value of a bit length, and a comparator to compare the counter value and an update value including bit values of bit positions of a first linear feedback shift register. The number of bit positions equal to the bit length of the counter value. A second linear feedback shift register to update based on the comparison.

28 Claims, 4 Drawing Sheets

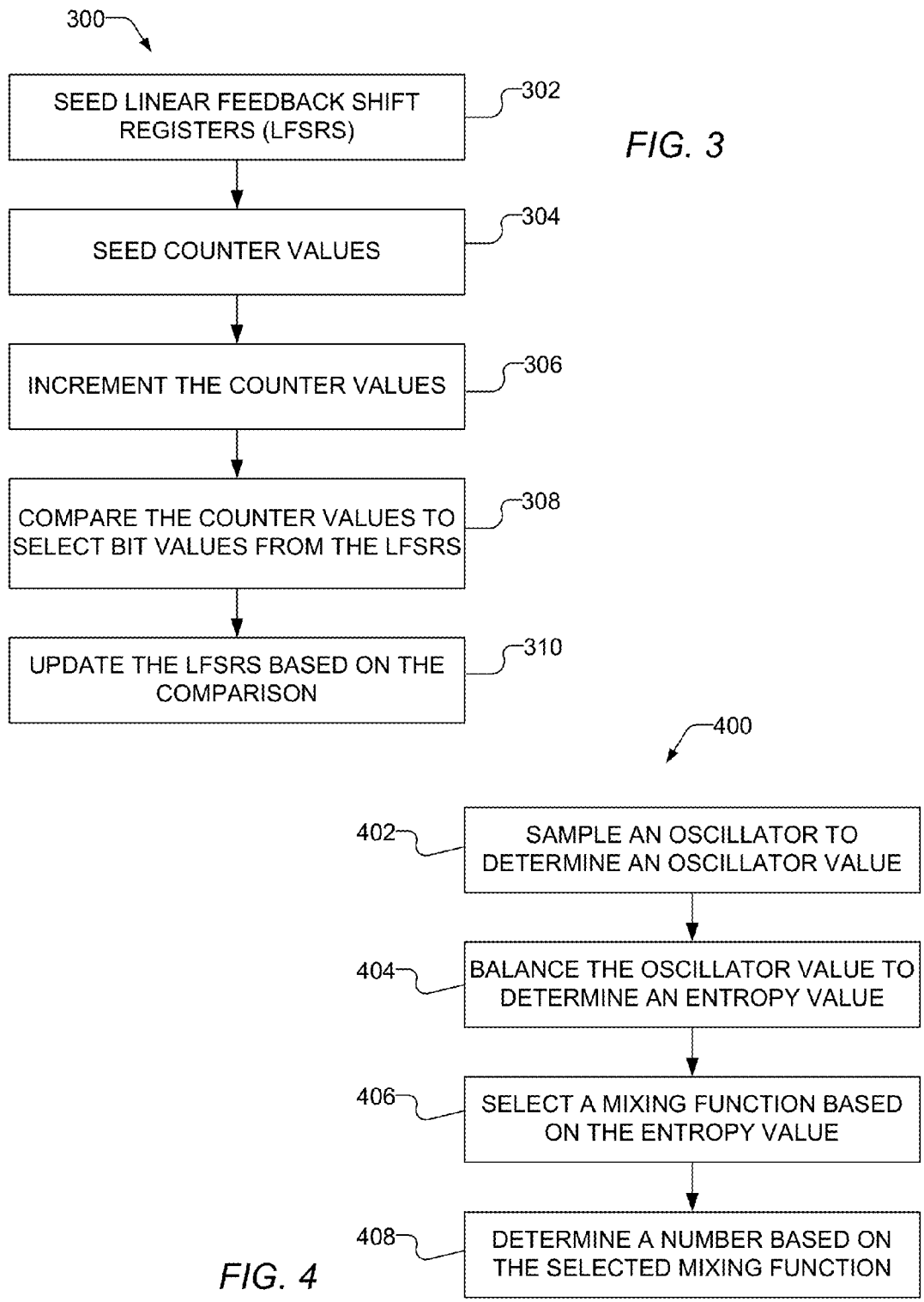

RANDOM NUMBER GENERATOR

FIELD OF THE DISCLOSURE

This disclosure, in general, relates to number generators providing random numbers as output.

BACKGROUND

Increasingly, random number generators are being used to generate encryption keys that are particularly useful for secure communications and encryption protocols. Encryption is useful in a variety of communications, including Internet communications, communications that stream audio and video data, as well as voice communications.

For example, encryption keys are useful in High-bandwidth Digital Content Protection (HDCP) to prevent copying of digital audio and video content as the content travels across connections. Exemplary connections protocols include DisplayPort (DP), Digital Visual Interface (DVI), and High-Definition Multimedia Interface (HDMI). Digital encryption keys are also useful in public-key cryptography, such as the Diffie-Hellman key exchange protocol using the RSA or Elliptical Curve Cryptography algorithms.

Random number generators can be implemented in either hardware, software, or a combination thereof. To prevent piracy of the encrypted content or the tampering with the hardware used to generate random numbers, the number generator should produce a number that is not deterministic or predictable. As such, an improved number generator would be desirable.

BRIEF DESCRIPTION OF THE DRAWINGS

The present disclosure may be better understood, and its numerous features and advantages made apparent to those skilled in the art by referencing the accompanying drawings.

FIG. 3 and FIG. 4 include block flow diagrams illustrating exemplary methods, according to embodiments.

The use of the same reference symbols in different drawings indicates similar or identical items.

DESCRIPTION OF THE PREFERRED EMBODIMENT(S)

In an exemplary embodiment, a device includes a plurality of linear feedback shift registers. The linear feedback shift registers are seeded with values from a plurality of oscillators and are updated asynchronously. The device also includes a mixing module that mixes bit values selected from the linear feedback shift registers in accordance with a mixing function to generate a number. In an example, the mixing function can be selected from a set of mixing functions. For example, the mixing function can be selected in accordance with a balanced entropy value derived from the value of an oscillator or an inverse value of the oscillator. To facilitate asynchronous updating of the linear feedback shift registers, each linear feedback shift register can be assigned a counter that is randomly seeded. When the counter reaches an update value, the associated linear feedback shift register can be updated. The update value can be derived from a subset of bits selected from a different linear feedback shift register.

In another embodiment, a method of generating a number includes asynchronously updating linear feedback shift registers, selecting a mixing function from a set of mixing functions and determining a number using bit values from the linear feedback shift registers according to the mixing function. In an example, the linear feedback shift registers are asynchronously updated using counters uniquely associated with each linear feedback shift register. The method can include seeding the counter with a counter value and incrementing the counter value until it reaches an update value. The update value can be derived from a set of bits selected from a different linear feedback shift register. The mixing function can be selected from a set of mixing functions based on a balanced entropy value. In an example, the method includes sampling an oscillator and alternately selecting the value of the oscillator or the inverse of the value of the oscillator as the balanced entropy value. In a particular example, the mixing function describes an ordered selection of bit values from bit positions of the plurality of linear feedback shift registers.

Figure 1:
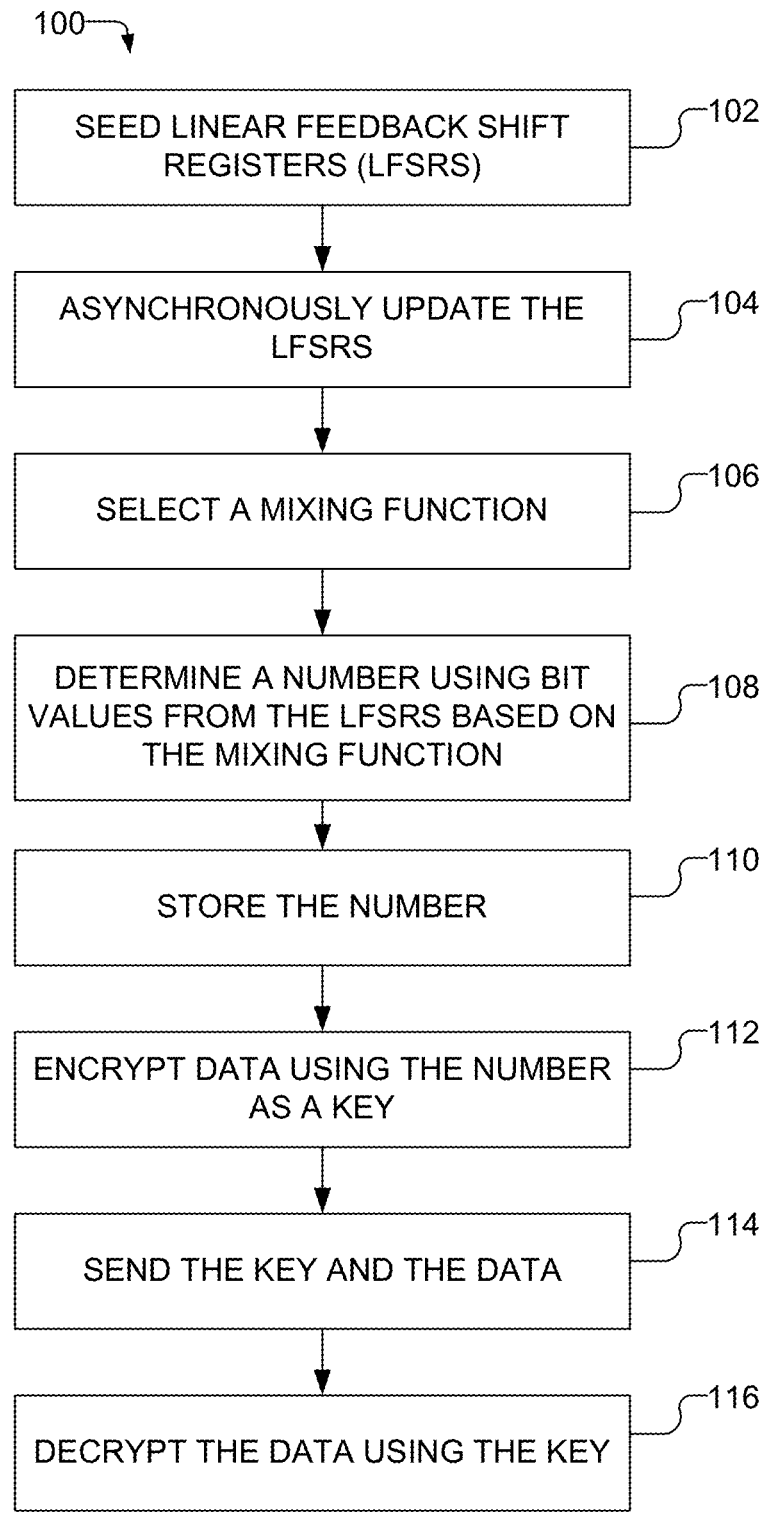
FIG. 1 includes an illustration of an exemplary block flow diagram illustrating a method, according to an embodiment.

As illustrated in FIG. 1, a method 100 includes seeding linear feedback shift registers (LFSRs), asynchronously updating the registers, and determining a number using bit values from the registers based on a mixing function. For example, the linear feedback shift registers can be seeded, as illustrated at 102. A random seed can be derived from a set of oscillators. In a particular example, the set of oscillators includes a number of oscillators equal to the total number of bit positions within the linear feedback shift registers.

For example, each oscillator can be uniquely associated with a bit position of a linear feedback shift register selected from the set of linear feedback shift registers. For an exemplary system including two 32-bit linear feedback shift registers, two sets of 32 oscillators or a total of 64 oscillators are utilized to generate random seed values for the linear feedback shift registers. In a particular example, a first set of 32 oscillators is associated with one 32-bit linear feedback shift register and a second set of 32 oscillators is associated with another 32-bit linear feedback shift register.

To initiate seeding, the device can be provided a reset signal based upon a start-up state, such as a power on reset state, an external signal, a reset instruction, and the like. Upon deassertion of the reset, the oscillators can cease and the seed values can be held static. The static seed values can be used to seed both the linear feedback shift register and a running counter.

As illustrated at 104, the linear feedback shift registers are updated at varying non-deterministic time bounded intervals. For example, the linear feedback shift registers are not updated at a fixed number of cycles of a clock. Further, the linear feedback shift registers may not be updated in a particular order. Instead, each linear feedback shift register can be updated non-deterministically and independently of other linear feedback shift registers, referred to herein as asynchronous. In a particular example, the linear feedback shift registers are each updated in accordance with a uniquely associated count and compare module. The value of a counter of the count and compare module can be seeded based on oscillator values. Further, the counter can initiate updating of the associated linear feedback shift register when the counter value increments to an update value. For example, the counter value can be incremented with each clock cycle. The update value can be derived from bits selected from bit positions of a different linear feedback shift register, as explained in more detail below.

As illustrated at 106, a mixing function can be selected. In an example, the mixing function describes the ordered selection of bit values from bit positions within the set of linear feedback shift registers. The system can include more than one mixing function selected based on the value of an entropy value. The entropy value can be a value derived from the value of an oscillator. In particular, a free running oscillator can be sampled to determine an entropy value. The entropy value can be alternately selected from the oscillator value or the inverse of the oscillator value. For example, with each update, the entropy value can toggle between the value of the oscillator and the inverse of the value of the oscillator. The entropy value is then used to select a mixing function of a set of mixing functions.

Based on the mixing function selected, a number can be generated using bit values from the linear feedback shift registers, as illustrated at 108. For example, the mixing function can describe an ordered selection from bit positions of the linear feedback shift registers. A number can be generated by concatenating bit values in the described ordered bit positions of the linear feedback shift registers. Alternatively, other mixing functions can be envisaged that include various operations on the bit values of the linear feedback shift registers.

The resulting generated number can have various uses depending upon the industry into which systems applied. In particular, the generated number can be used as at least a portion of a key for encryption. For example, as illustrated at 110, the generated number can be stored. The generated number can be stored in a tangible and in transitory storage medium.

As illustrated at 112, the generated number can be used as a portion of an encryption key used to encrypt data. The encryption key and the encrypted data can be sent, as illustrated at 114. For example, the encryption key can be sent as part of a public-key encryption algorithm. Subsequently, data encrypted using the encryption key can be sent to a remote device. The encryption key can be used to decrypt the encrypted data at a remote device, as illustrated at 116. While the method 100 is particularly useful for encrypting data, other uses can be envisioned for utilizing a number generated as described above.

Figure 2:
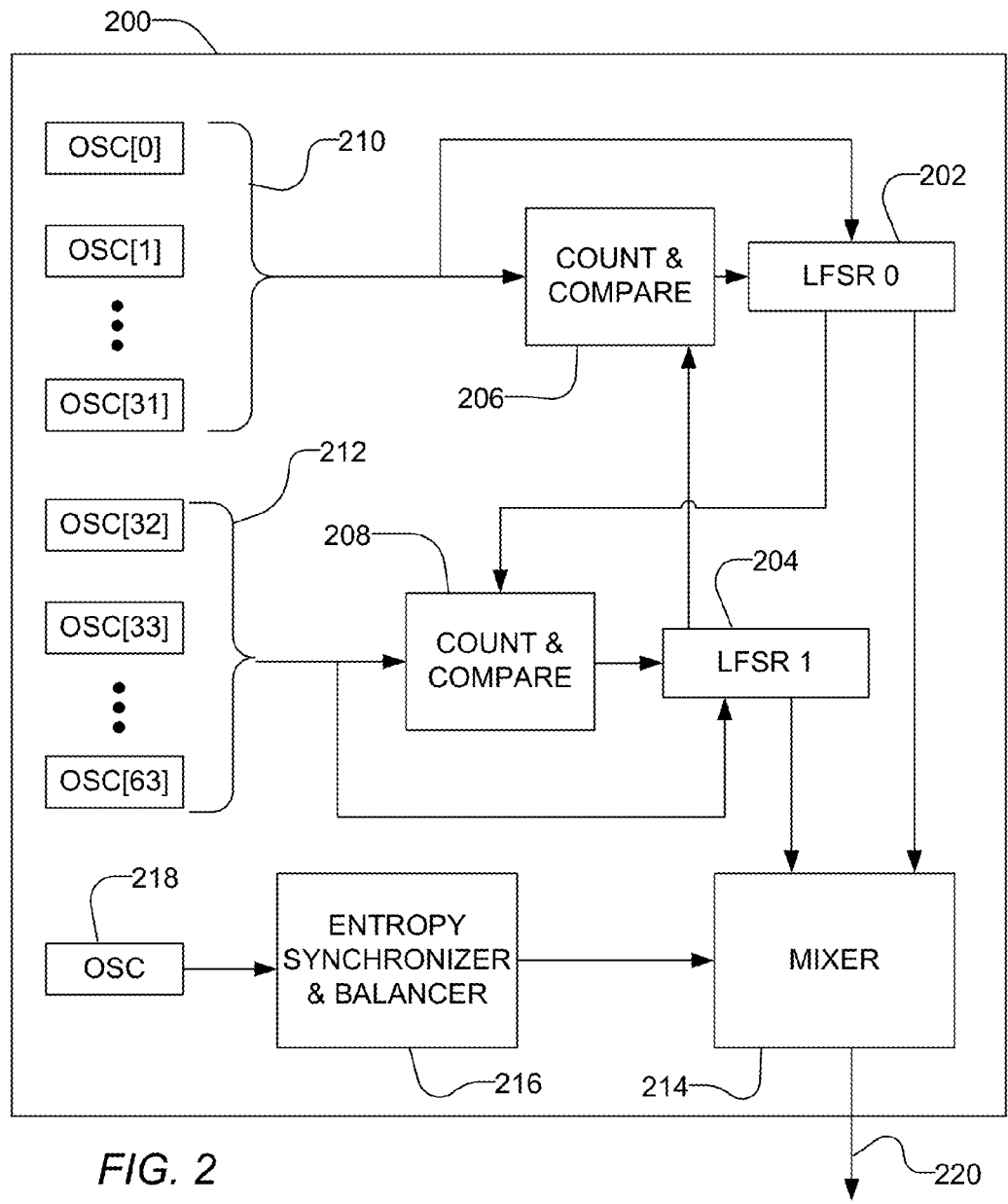
FIG. 2 includes an illustration of an exemplary device to generate a number.

FIG. 2 includes an illustration of an exemplary device 200 for generating a number. The device 200 includes linear feedback shift registers 202 and 204. Each linear feedback shift register 202 or 204 is coupled to a set of oscillators 210 or 212. In addition, the linear feedback shift registers 202 or 204 are coupled to a mixer 214. Based on the values of the linear feedback shift registers 202 and 204, the mixer 214 generates a number output 220.

In addition, each linear feedback shift register is associated with a count and compare module. For example, the linear feedback shift register 202 is associated with a count and compare module 206 and the linear feedback shift register 204 is associated with a count and compare module 208. The count and compare modules 206 and 208 are configured to initiate an update of the linear feedback shift register (202 or 204) based on a comparison of a counter value and an update value. In an example, the count and compare modules 206 or 208 can include counter values that are seeded based on select oscillators of the oscillator sets 210 or 212. For example, upon reset, the bit values of the linear feedback shift register 202 can be updated based on values of the oscillator set 210. In addition, a subset of the oscillator values of the set of oscillators 210 can be used to seed the count value of the count and compare module 206. With each clock cycle, the count value can be incremented until it reaches an update value. When the count value reaches an update value, an update of the linear feedback shift register 202 can be initiated. In another example, the count value of the count and compare module 208 can be seeded during resets when the linear feedback shift register 204 is seeded. The count and compare module 208 can initiate an update in the linear feedback shift register 204 when the count value of the count and compare module increments to an update value.

Each count and compare module can derive its update value from a set of bits derived from a linear feedback shift register different than the linear feedback shift register is update is controlled by the count and compare module. As illustrated in FIG. 2, the linear feedback shift register 204 can provide a subset of bit values to be used in determining an update value of the count and compare module 206. Similarly, the linear feedback shift register 202 can provide a set of bits used in determining an update value of the count and compare module 208.

Figure 7:
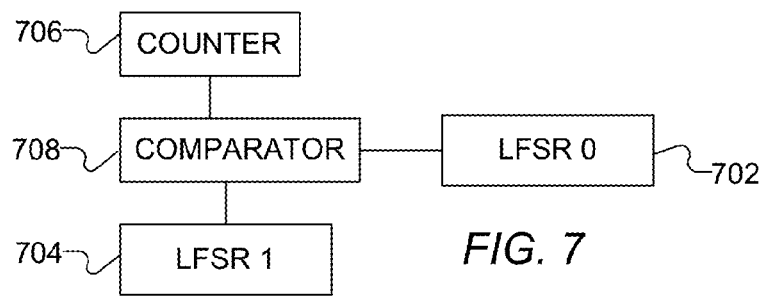
FIG. 7 includes an illustration of an exemplary count and compare module.

In a particular example illustrated in FIG. 7, a count and compare module is separated into components including a counter 706 and a comparator 708. The seeded counter 706 increments a counter value, and the comparator 708 compares the counter value to bits selected from a linear feedback shift register 704, representing an update value. The number of bit positions accessed in the linear feedback shift register equals the bit length of the counter value. When the update value equals the counter value, the comparator 708 can initiate an update in the linear feedback shift register 702. In an alternate embodiment, LFSR 1 can be updated when the update value equals the counter value.

To further illustrate the operation of the exemplary linear feedback shift registers, a method 300 of FIG. 3 includes seeding a plurality of linear feedback shift registers, as illustrated at 302. In addition, counter values of a count and compare module can be seeded, as illustrated at 304. For example, when a number generator is held in reset, a set of oscillators, such as oscillators 210 or 212, are allowed to oscillate. Upon deassertion of the reset, the oscillators cease and the seed values are held static. The seed values can be used to seed both the linear feedback shift registers and the counter values during resets. In particular, each of the linear feedback shift registers is independently seeded. In other words, the linear feedback shift registers are not seeded with the same value. For example, as illustrated in FIG. 2, a set of oscillators 210 is used to seed the linear feedback shift register 202 and a different set of oscillators 212 is used to seed the linear feedback shift register 204.

In addition, the counter values can be seeded utilizing a subset of the oscillator values. Each counter value is seeded with values from a different set of oscillators. As a result, the counter values can be seeded with different values. In an example in which the system includes two 32-bit linear feedback shift registers, there are 64 seed oscillators. The counters can have a bit length in a range of two bits to six bits. For example, the counter can have a bit length of four bits. In an example, the seed values for each counter value of a count and compare module are derived from the oscillators associated with the linear feedback shift register that is to update in response to the count and compare module. Alternatively, the counter value of the count and compare module can be seeded with values selected from a subset of oscillators associated with different linear feedback shift registers. The oscillators can be in a consecutive order or can be selected from oscillators that are not consecutive.

In a particular example utilizing two 32-bit linear feedback shift registers and to 4-bit count and compare modules, 64 seed oscillators can be used. In a particular example, the linear feedback shift registers and the counter values can be seeded as illustrated in Table 1.

TABLE 1

Exemplary Seed Logic

```
count0q <= irndm_seed[0+:4];
count1q <= irndm_seed[4+:4];
lfsr0q <= irndm_seed[31:0];
lfsr1q <= irndm_seed[63:32];
``` wherein count0q and count1q represent counter values, lfsr0$q$ and lfsr1q represent linear feedback shift register values, and irndm_seed functions to provide seed values from a set of oscillators either specified as a starting position indicated with a '+' and a number of bits or specified as a range of values where an initial value and final value of the range a separated by a colon.

Returning to FIG. 3, the counter values are incremented, as illustrated at 306. For example, the counter values can be incremented with each clock cycle. Alternatively, the counter values can be incremented at multiples of the clock cycle.

As illustrated at 308, the counter values are compared to update values based on select bit values from a linear feedback shift register. In an example, the update value is determined based on a 4-bit segment of a linear feedback shift register for which the count and compare module does not initiate an update. The 4-bit segment can be derived from a select set of consecutive bits of the linear feedback shift register or can be derived from non-consecutive bits of the linear feedback shift register.

Based on the comparison, a linear feedback shift register associated with the count and compare module can be updated, as illustrated at 310. In particular, when the update value derived from a different linear feedback shift register segment matches the running counter value, the linear feedback shift register associated with the count and compare module is incremented to its next pseudorandom value. The comparison against a running value of the counter is implemented to introduce variability in the update frequency of each linear feedback shift register. The update is bound by the bit width of the counter. Hence, each linear feedback shift register increments at a rate between 1 and 16 cycles for a 4-bit register, depending on the current pseudorandom value and the value of running counter. To reduce self-dependency, the comparator for each linear feedback shift register compares against a segment, such as a 4-bit segment, from a different linear feedback shift register. Such a use of a comparator prevents the update frequency of a particular linear feedback shift register from being a direct function of its own pseudorandom sequence. To further introduce variability, a single bit of each linear feedback shift register can select one of two 4-bit segments from the different linear feedback shift register for comparison. The combination of the running counter and comparator effect a modulation of the update. Table 2 illustrates the use of the counters and comparators.

TABLE 2

Counter and Update Logic

```
wire update_en0 = (count0q == cmpr_val0);
wire update_en1 = (count1q == cmpr_val1);
always @ (lfsr0q or lfsr1q) begin
```

TABLE 2-continued

Counter and Update Logic

```
  case(lfsr1q[11])
    1'b0 : cmpr_val0 = lfsr1q[31:28];
    1'b1 : cmpr_val0 = lfsr1q[23:20];
  endcase
  case(lfsr0q[17])
    1'b0 : cmpr_val1 = lfsr0q[15:12];
    1'b1 : cmpr_val1 = lfsr0q[7:4];
  endcase
end
always @ (posedge icclk) begin
  if (!local_rstn) begin
    count0q <= irndm_seed[0+:4];
    count1q <= irndm_seed[4+:4];
  end else begin
    count0q <= count0q + 1'b1;
    count1q <= count1q + 1'b1;
  end
end
```

An update (update_en0 or update_en1) is true based on a comparison of a counter value (count0$q$ or count1q) and a comparison value or update values (cmpr_val0 or cmpr_val1). The comparison value is selected from bits of a linear feedback shift register based on bit positions such as 11 or 17 of the linear feedback shift register. The counter values are increments with each clock cycle (posedge icclk) unless the counter values are being seeded with a random seed.

Returning to FIG. 3, the linear feedback shift registers update based on the comparison, as illustrated at 310. Each linear feedback shift register outputs a pseudorandom sequence. Each linear feedback shift register includes a set of taps that are XOR' d sequentially, for example, starting with the right most bit, with the output fed back into the leftmost bit of the linear feedback shift register.

Each linear feedback shift register can include the same number of taps at the same positions. Alternatively, each linear feedback shift register of the plurality of linear feedback shift registers can include a different number of taps than another linear feedback shift register of the plurality of linear feedback shift registers. In another example, each linear feedback shift register can include different tap positions than other linear feedback shift registers of the plurality of linear feedback shift registers. For example, one linear feedback shift register can use two taps while a different linear feedback shift register uses four taps. In another example, a linear feedback shift register can use taps at positions [31], [18], [17], and [12] while a different linear feedback shift register uses taps at [31], [26], [24] and [4]. In a further example, the taps of a linear feedback shift register can be changed, for example, based on the value of a selection bit. For an exemplary 32-bit linear feedback shift register, a maximum length of the pseudorandom sequence is ($2^{31}-1$). Table 3 illustrates exemplary taps implemented in accordance with the logic.

TABLE 3

Exemplary Tap Selection

```
case(itap_select[0])
  1'b0 : xor_lfsr0 = lfsr0q[31] ^ lfsr0q[18] ^ lfsr0q[17] ^ lfsr0q[12];
  default : xor_lfsr0 = lfsr0q[31] ^ lfsr0q[24] ^ lfsr0q[16] ^ lfsr0q[6];
endcase
case(itap_select[1])
  1'b0 : xor_lfsr1 = lfsr1q[31] ^ lfsr1q[26] ^ lfsr1q[24] ^ lfsr1q[4];
  default : xor_lfsr1 = lfsr1q[31] ^ lfsr1q[22] ^ lfsr1q[20] ^ lfsr1q[15];
endcase
```

Returning to FIG. 2, the linear feedback shift registers can include a safety mechanism to prevent an all-zero scenario. Such a mechanism can include adding a one into a bit value of the linear feedback shift register. An all-zero scenario should not occur for normal operation. The safety mechanism serves as a countermeasure to attacks seeking to force the number generator to zero. Further, the safety mechanism ensures that a nonzero seed is employed in the rare event that the oscillator-based random seed is zero.

Table 4 includes exemplary logic to update linear feedback shift registers and to detect and correct an all zero scenario.

TABLE 4

Linear Feedback Shift Register Update
Logic and All-Zero Correction

```
wire zero_case0 = (lfsr0q == 32'b0);
wire zero_case1 = (lfsr1q == 32'b0);
always @ (posedge icclk) begin
if (!local_rstn) begin
lfsr0q <= irndm_seed[31:0];
lfsr1q <= irndm_seed[63:32];
end
else begin
if (update_en0)
lfsr0q <= {lfsr0q[30:0], (xor_lfsr0 | zero_case0)};
if (update_en1)
lfsr1q <= {lfsr1q[30:0], (xor_lfsr1 | zero_case1)};
end
end
```

The value of the linear feedback shift register (lfsr0q or lfsr1q) is updated during a clock cycle when the update bit is set to true and is updated in accordance with the selected taps (xor_lfsr0 or xor_lfsr1) unless the values are all zero (zero_case0, zero_case1).

The linear feedback shift register does not increment on each clock cycle. Instead, it can increment when a segment of a linear feedback shift register output matches the counter value of the count and compare module. Such a method serves to modulate the update frequency of the linear feedback shift register such that it is not incremented at exact intervals. Rather the linear feedback shift register updates between 1 and 16 cycles for a 4-bit counter after each subsequent update.

Returning to FIG. 2, the output from the linear feedback shift registers 202 and 204 is supplied to a mixer 214 that generates a number output 220 in accordance with a mixing function. The mixing function can be selected from a set of mixing functions based on an entropy value derived from an entropy synchronizer and balancer module 216. For example, the entropy synchronizer and balancer module 216 is connected to an oscillator 218, such as a free running oscillator. The free running oscillator can run at a different clock speed than the entropy synchronizer and balancer module 216. The entropy synchronizer and balancer module 216 can derive an entropy value from the value of the oscillator 218. A mixing function can be selected from a set of mixing functions based on the entropy value. The selected mixing function is applied by the mixer 214 to the linear feedback shift registers 202 and 204.

As illustrated, the source of the entropy value is a single oscillator 218, which can be allowed to oscillate indefinitely. The output of the oscillator 218 is sampled by the entropy synchronizer and balancer module 216. The entropy synchronizer and balance module 216 determines an entropy value that influences the selection of a mixing function.

In a particular example, FIG. 4 illustrates a method 400 for determining a number. As illustrated at 402, an oscillator is sampled to determine an oscillator value. In the case of a single bit oscillator, the value of the oscillator varies between zero and one, providing two states. An entropy synchronizer and balancer module 216 samples the single bit oscillator value to determine an entropy value that is used to select between two mixing functions. Alternatively, more than one oscillator can be used to generate an entropy value having more than one bit and thus more than two states. In such a manner, more than two mixing functions can be specified from which one can be selected. In particular, the oscillator 218 oscillates asynchronously relative to the entropy synchronizer and balancer module 216.

In a further example, the entropy value is balanced to provide a value that has an equal likelihood of being one or zero for each bit of the entropy value. In a particular example, balancing is performed by alternately selecting either the value of the oscillator or the inverse value of the oscillator. As such, the entropy synchronizer and balancing module 216 toggles between the value and the inverse value to provide an even likelihood of selecting one of two mixing functions. Such a method balances metastable behavior, if present, in the synchronization portion of the module. Table 5 includes an illustration of exemplary entropy bit determination.

TABLE 5

Entropy Bit Determination

```
//Synchronize the entropy component
reg random_osc_async, random_osc0q;
always @ (posedge icclk) begin
random_osc_async <= random_osc;
random_osc0q <= random_osc_async;
end
//Balance the entropy component
reg random_osc_balance0q;
always @ (posedge icclk) begin
if (!local_rstn) begin
random_osc_balance0q <= irndm_seed[0];
end else begin
random_osc_balance0q <= ~random_osc_balance0q;
end
end
wire mixing_function_sel = random_osc_balance0q ? random_osc0q : ~random_osc0q;
```

A mixing function (mixing_function_sel) is selected based on a value (random_osc0q or it inverse) based on a toggled entropy bit (random_osc balance0q), which is inverted each clock cycle.

Returning to FIG. 4, the oscillator value is balanced, as illustrated at 404, to determine an entropy value. The mixing function is selected based on the entropy value, as illustrated at 406. In particular, the output of the entropy synchronizer and balancer module 216 is used to control the mixing function of the set of linear feedback shift registers. Table 6 includes an example of an output of the mixing function.

TABLE 6

Exemplary Mixing Logic

```
case (mixing_function_sel)
1'b1: orndm_data = {lfsr0q[15:0], lfsr1q[15:0], lfsr0q[31:16], lfsr1q[31:16]};
1'b0: orndm_data = {lfsr0q[31:16], lfsr1q[31:16], lfsr1q[15:0], lfsr0q[15:0]};
endcase
```

Based on the mixing function selection (mixing_function_sel), a number (orndm_data) is generated based on an ordered selection of bits from two linear feedback shift registers (lfsr0q and lfsr1q).

Further, the mixing function may be described as any Boolean or combination of sequential and Boolean operations which produces an output as a function of the linear feedback shift registers and the balanced entropy bit which does not serve to reduce the random characteristics of the output value. Namely, this mixing function does not reduce the distribution of ones (1's) and zeroes (0's) produced by the valid pseudorandom linear feedback shift sequences, or introduce deterministic patterns in the output bit distribution. Generically, the mixing function may be illustrated as:

Orndm_data=f(mixing_function_sel, lfsr0, . . . , lfsrn);

As illustrated at 408, the number is generated based on selected mixing function. In particular, the mixing function specifies an ordered arrangement of bit values selected from the set of linear feedback shift registers.

While the devices and methods are described above in terms of two linear feedback shift registers, more than two linear feedback shift registers can be used. A count and compare module can be associated with each linear feedback shift register and update value can be provided from a different linear feedback shift register than the one associated with the count and control module.

Linear feedback shift registers can have various sizes, such as 16-bit, 32-bit, or 64-bit size. Alternatively, each linear feedback shift register can include a different number of bits. For example, one linear feedback shift register can have 32 bits and a different linear feedback shift register can have 16 bits. In another example, the number of taps and the position of taps of each linear feedback shift register can be different than those of other linear feedback shift registers of the plurality of linear feedback shift registers. In a further example, a free running entropy oscillator can have more than two bits providing for entropy values that that permit selection between more than two mixing functions. For example, a two bit entropy value can provide for selection between four mixing functions.

Further, FIG. 2 illustrates a hardware implementation of the number generator. However, all or portions of the generator can be implemented in computer implemented instructions operable by a processor to perform the methods described above. Such computer implemented instructions can be stored on a tangible and intransitory medium and can be operable by a processor to perform one or more of the method steps described above.

Figure 5:
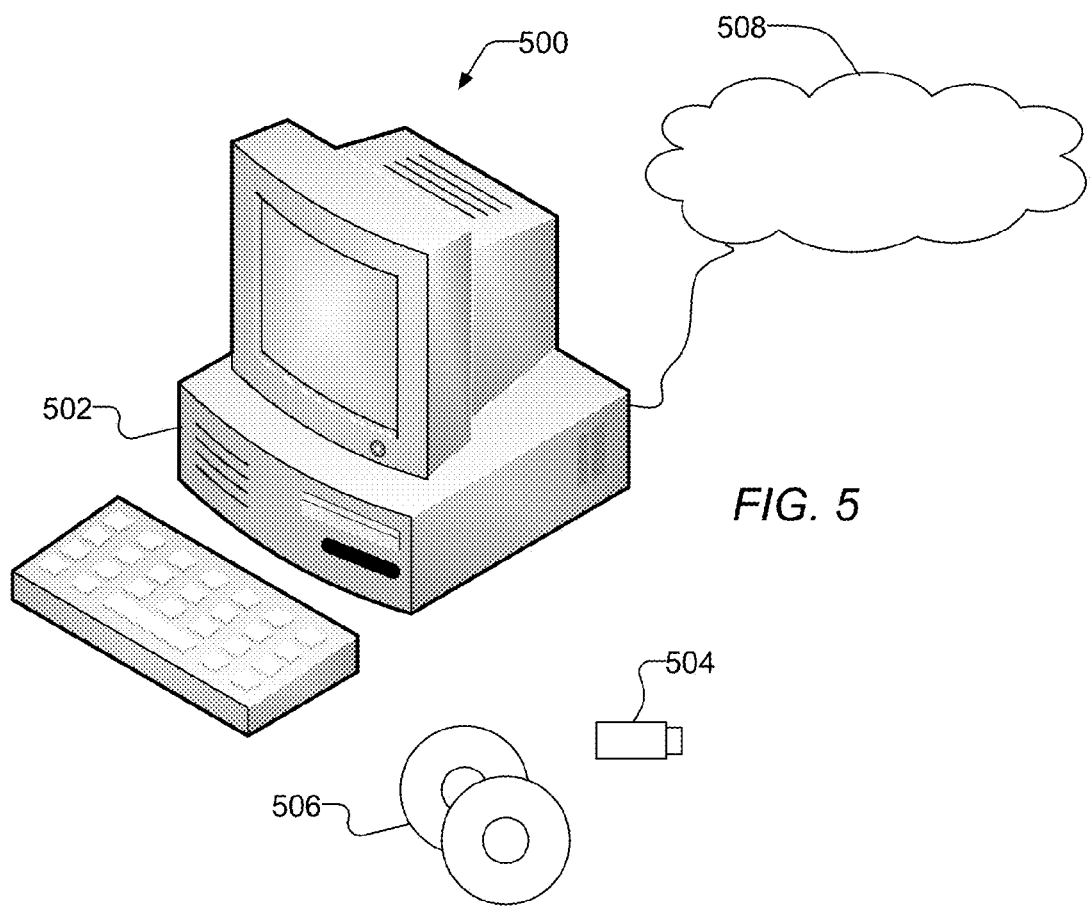
FIG. 5 and FIG. 6 include illustrations of exemplary systems, according to embodiments.

As illustrated in FIG. 5, a number generator can be stored within a computational circuitry 502, such as a computer forming part of a system 500. Computer implemented instructions can be intransitorily stored on tangible media, such as thumb drive 504 or storage 506. In particular, the computational circuitry 502 can be in communication with a network 508. Communications with the network 508 can be encrypted using an encryption key derived at least in part based on the number generated by the number generator.

Figure 6:
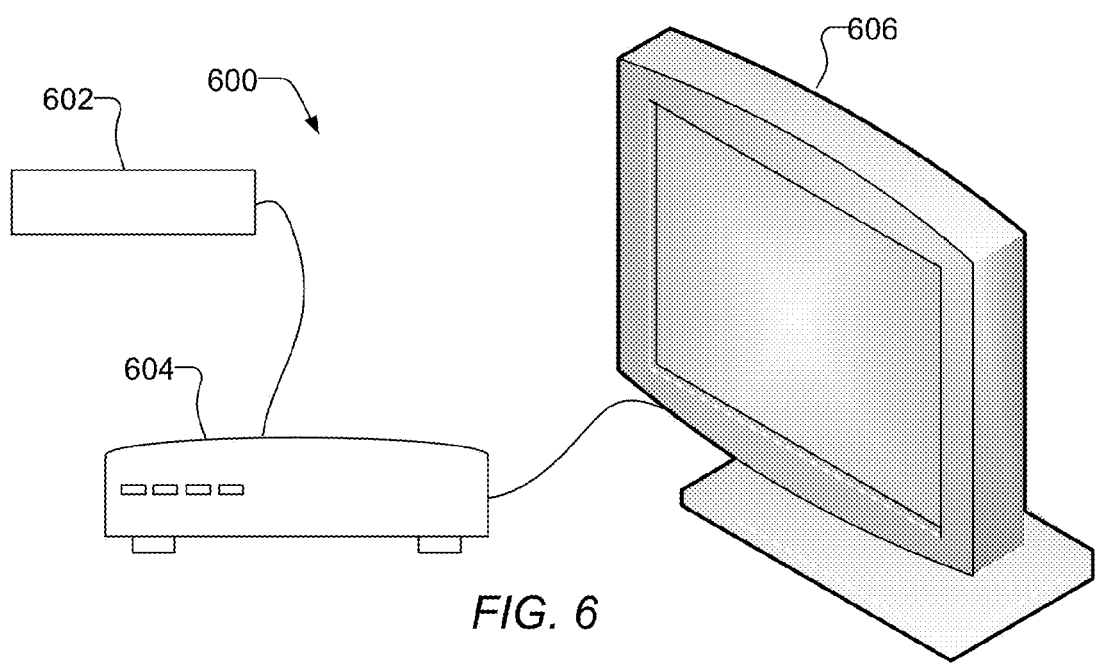

In another embodiment illustrated in FIG. 6, a system 600 includes remote video equipment 602, local equipment 604, and a display device 606. A random number generator can be utilized to secure and encrypt communication between the remote device 602 and the local device 604 or can be used to secure and encrypt communication between the local device 604 and the display 606.

Output from a hardware implementation of the device illustrated in FIG. 2 is tested using standard testing methods including Frequency testing, Block Frequency testing, Cumulative Sums testing, Runs testing, Longest Runs testing, Non-overlapping Template testing, Overlapping Template testing, Approximate Entropy testing, Random excursions testing, Serial Testing, and Linear Complexity testing.

Frequency Testing tests the proportion of zeroes and ones for a sequence. The test determines whether the number of ones and zeros in a sequence is approximately the same as would be expected for a truly random sequence. The test assesses the closeness of the fraction of ones to ½.

Block Frequency testing tests the proportion of zeroes and ones within M-bit blocks. The purpose of this test is to determine whether the frequency of ones in an M-bit block is approximately M/2.

Cumulative Sums testing test the maximal excursion (from zero) of the random walk defined by the cumulative sum of adjusted (−1, +1) digits in the sequence. The purpose of the test is to determine whether the cumulative sum of the partial sequences occurring in the tested sequence is too large or too small relative to the expected behavior of that cumulative sum for random sequences.

Runs testing tests the total number of zero and one runs in the entire sequence, where a run is an uninterrupted sequence of identical bits. A run of length k means that a run consists of exactly k identical bits and is bounded before and after with a bit of the opposite value. The purpose of the runs test is to determine whether the number of runs of ones and zeros of various lengths is as expected for a random sequence.

Longest Runs testing test the longest run of ones within M-bit blocks. The purpose of this test is to determine whether the length of the longest run of ones within the tested sequence is consistent with the length of the longest run of ones that would be expected in a random sequence.

Non-overlapping Template testing tests the number of occurrences of pre-defined target substrings. The test is to reject sequences that exhibit too many occurrences of a given non-periodic (aperiodic) pattern. An m-bit window is used to search for a specific m-bit pattern. If the pattern is not found, the window slides one bit position. When the pattern is found, the window is reset to the bit after the found pattern, and the search resumes.

Overlapping Template testing test the number of pre-defined target substrings. The test is to reject sequences that show deviations from the expected number of runs of ones of a given length. Note that when there is a deviation from the expected number of ones of a given length, there is also a deviation in the runs of zeroes.

Approximate Entropy Testing tests the frequency of each and every overlapping m-bit pattern. The test is to compare the frequency of overlapping blocks of two consecutive/adjacent lengths (m and m+1) against the expected result for a random sequence.

Random Excursion Testing tests the number of cycles having exactly K visits in a cumulative sum random walk. The cumulative sum random walk is found if partial sums of the (0,1) sequence are adjusted to (−1, +1). A random excursion of a random walk consists of a sequence of n steps of unit length taken at random that begin at and return to the origin. The test is to determine if the number of visits to a state within a random walk exceeds what one would expect for a random sequence.

Serial Testing tests the frequency of overlapping m-bit patterns across the entire sequence. The test is to determine whether the number of occurrences of the 2 m m-bit overlapping patterns is approximately the same as would be expected for a random sequence.

Linear Complexity Testing tests the length of a generating feedback register. The test is to determine whether or not the sequence is complex enough to be considered random.

For the Frequency testing, Block Frequency testing, Cumulative Sums testing, Runs testing, Longest Runs testing, Non-overlapping Template testing, Overlapping Template testing, Approximate Entropy testing, Serial Testing, and Linear Complexity testing, the minimum pass rate is 232 for a sample size of 240. The above device passed each of the tests providing a pass rate of greater than 232 for each test. In addition, the device passed the Random Excursions testing with pass rates above 146 for a sample size of 149; a rate of 143 is considered passing.

The terms "pseudorandom" and "random" are used interchangeably herein to represent numbers have characteristics that have characteristics similar to truly random numbers. The term "periodically" means from time-to-time and does not require a fixed time interval.

In an first aspect, a device includes a plurality of linear feedback shift registers, a counter to provide a counter value of a bit length, and a comparator to compare the counter value and an update value that includes bit values of bit positions of a first linear feedback shift register. The number of bit positions is equal to the bit length of the counter value. A linear feedback shift register of the plurality of linear feedback registers updates based on the comparison.

In an example of the first aspect, the linear feedback shirt register is to be updated based upon the comparison is a second linear feedback register. The device further includes a second counter having a second counter value and a second comparator to compare the second counter value and a second update value including bit values of bit positions of the second linear feedback shift register. The first linear feedback shift register is to update based on the comparison of the second counter value to the second update value. The device can further include a plurality of oscillators coupled to the first linear feedback shift register. In an additional example. A number of the plurality of oscillators can be at least the number of bit positions of the first linear feedback shift register. Each oscillator of the plurality of oscillators can be uniquely associated with a bit position of the first linear feedback shift registers. Further, a set of oscillators of the plurality of oscillators can be coupled to the counter. In another example, a set of oscillators that are not coupled to the first linear feedback shift register can be coupled to the counter. In addition, the device can further include a mixing module coupled to the plurality of linear feedback shift registers. The mixing module is to concatenate bit values selected from the plurality of linear feedback shift registers based on a mixing function. For example, the device can further include an entropy oscillator coupled to an entropy module. The entropy module can be coupled to the mixing module. The entropy module is to sample a value of the entropy oscillator to determine an entropy value. The mixing function is selected from a plurality of mixing functions based on the entropy value. In a further example, determining the entropy value is alternately determined based on the non-inverse value of the entropy oscillator and the inverse of the value of the entropy oscillator.

In an additional example of the first aspect or above examples, the bit length is between 2 and 6. In a further example of the first aspect or the above examples, the second linear feedback shift register is to update when the counter value equals the update value. In another example of the first aspect or the above examples, the bit positions of the first linear feedback shift registers are not consecutive. In an additional example of the first aspect and the above examples, a number of tap positions of the first linear feedback shift registers is different than the number of tap positions of the second linear feedback shift registers. In a particular example of the first aspect or the above examples, tap positions of the first linear feedback shift registers are different than tap positions of the second linear feedback shift registers.

In a second aspect, a method of generating a number includes incrementing a counter value, comparing the counter value to an update value comprising bit values selected from a first linear feedback shift register, updating a second linear feedback shift register based on the comparing, and determining an output based on bit values of the aggregation of linear feedback shift registers.

In an example of the second aspect, the method further includes seeding the counter value. For example, seeding the counter value can include sampling values of a plurality of oscillators. The method can further include seeding the first and second linear feedback shift registers with values sampled from the plurality of oscillators. In particular, seeding the counter value can include sampling oscillators of the plurality of oscillators associated with the second linear feedback shift register.

In another example of the second aspect or the above examples, updating the second linear feedback shift register includes updating when the counter value equals the update value.

In a third aspect, a device includes a plurality of linear feedback shift registers, a plurality of counters, each counter to increment a counter value, and a plurality of comparators. Each comparator is to compare the counter value of a corresponding counter to bit values selected from a corresponding first associated linear feedback shift register. A second corresponding linear feedback shift register is to update based on the comparison.

In an example of a third aspect, the device further includes a plurality of oscillators. Each oscillator of the plurality of oscillators is uniquely associated with a bit position of the plurality of linear feedback shift registers.

In an additional example of the third aspect or the above examples, the device further includes a mixing module coupled to the plurality of linear feedback shift registers. The mixing module is to determine a number based on the plurality of linear feedback shift registers. For example, the device can further include an entropy oscillator and an entropy module coupled to the entropy oscillator and the mixing module. The entropy module is to determine an entropy value based on a value of the entropy oscillator. Further, the entropy module can determine the entropy value as alternately the value of the entropy oscillator or the inverse of the value of the entropy oscillator. In addition, the mixing module can determine the number based on a mixing function. The mixing function can be selected from a plurality of mixing functions based on the entropy value.

In a fourth aspect, a method of generating a number includes incrementing a plurality of counter values. Each counter value is associated with first and second associated linear feedback shift registers selected from a plurality of linear feedback shift registers. The method further includes determining a plurality of update values. Each update value includes bit values selected from the first associated linear feedback shift register. Each update value is associated with a counter value of the plurality of counter values. The method also includes comparing each update value with the associated counter value, updating the second associated linear feedback shift register based on the comparing, and determining an output based on the plurality of linear feedback shift registers.

In an example of the fourth aspect, the method further includes updating the second associated linear feedback shift register is performed when the each update value is equal to the associated counter value.

In another example of the fourth aspect or the above examples, the method further includes determining the output includes applying a mixing function to the plurality of linear feedback shift registers. For example, the method can further include selecting the mixing function from a plurality of mixing functions. In addition, the method can include sampling an entropy oscillator value to determine an entropy value. Selecting the mixing function can include selecting the mixing function based on the entropy value. Further, determining the entropy value can include alternately selecting the entropy oscillator value or the inverse of the entropy oscillator value.

In a fifth aspect, a method of generating a number includes asynchronously updating a plurality of linear feedback shift registers, selecting a mixing function using a balanced entropy value, and determining the number from bit values selected from the plurality of linear feedback shift registers based on the selected mixing function.

In an example of the fifth aspect, the method further includes seeding the plurality of linear feedback shift registers. For example, seeding the plurality of linear feedback shift registers can include seeding the plurality of linear feedback shift registers with values of a plurality of oscillators. Each oscillator of the plurality of oscillators is uniquely associated with a bit position of the plurality of linear feedback shift registers.

In another example of the fifth aspect or the above examples, selecting a mixing function includes sampling an entropy oscillator value, alternately selecting the entropy oscillator value or the inverse of the entropy oscillator value as the balanced entropy value, and selecting the mixing function from a plurality of mixing functions based on the balanced entropy value.

In an additional example of the fifth aspect or the above examples, asynchronously updating the plurality of linear feedback shift registers includes incrementing a plurality of counter values, each counter value associated with first and second associated linear feedback shift registers selected from the plurality of linear feedback shift registers; determining a plurality of update values, each update value comprising bit values selected from the first associated linear feedback shift register, each update value associated with a counter value of the plurality of counter values; comparing each update value with the associated counter value; and updating the second associated linear feedback shift register based on the comparing. For example, updating the second associated linear feedback shift register can be performed when the each update value is equal to the associated counter value.

In a further example of the fifth aspect or the above examples, the method further includes storing the number on a non-transitory storage medium. In another example of the fifth aspect or the above examples, the method further includes forming an encryption key based on the number. In an additional example of the fifth aspect or the above examples, the method further includes encrypting data based on the encryption key. For example, the method can further include sending the encrypted data and the encryption key to a remote device. In an additional example, the method can further include decrypting the encrypted data at the remote device using the encryption key.

In a sixth aspect, a method of generating a number includes sampling an oscillator to determine an oscillator value, alternately selecting the oscillator value or the inverse of the oscillator value to determine an entropy value, and selecting a mixing function from a plurality of mixing functions based on the entropy value.

In an example of the sixth aspect, the method further includes applying the mixing function to a plurality of linear feedback shift registers to determine the number.

In a seventh aspect, a system includes an oscillator, an entropy module coupled to the oscillator, the entropy module to set an entropy value alternately based on the value of the oscillator or the inverse of the oscillator, and a mixing module coupled to the entropy module, the mixing module to determine a pseudorandom number based on a mixing function and bit values of a plurality of linear feedback shift registers, the mixing function selected from a plurality of mixing functions based on the entropy value.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A device comprising:
   a plurality of linear feedback shift registers;
   a counter to provide a counter value of a bit length; and
   a comparator to compare the counter value and an update value that includes bit values of bit positions of a first linear feedback shift register of the plurality of linear feedback shift registers, the number of bit positions equal to the bit length of the counter value, an output of the comparator to initiate an update of a second linear feedback shift register of the plurality of linear feedback registers based on the comparison.

2. The device of claim 1, wherein the device further comprising:
a second counter having a second counter value; and
a second comparator to compare the second counter value and a second update value including bit values of bit positions of the second linear feedback shift register, an output of the second comparator to initiate an update of the first linear feedback shift register based on the comparison of the second counter value to the second update value.

3. The device of claim 1, further comprising a plurality of oscillators coupled to the first linear feedback shift register.

4. The device of claim 3, wherein a number of the plurality of oscillators is at least the number of bit positions of the first linear feedback shift register.

5. The device of claim 3, wherein each oscillator of the plurality of oscillators is uniquely associated with a bit position of the first linear feedback shift registers.

6. The device of claim 3, wherein a set of oscillators of the plurality of oscillators are coupled to the counter.

7. The device of claim 3, wherein a set of oscillators that are not coupled to the first linear feedback shift register are coupled to the counter.

8. The device of claim 3, further comprising a mixing module coupled to the plurality of linear feedback shift registers, the mixing module to concatenate bit values selected from the plurality of linear feedback shift registers based on a mixing function.

9. The device of claim 8, further comprising an entropy oscillator coupled to an entropy module, the entropy module coupled to the mixing module, the entropy module to sample a value of the entropy oscillator to determine an entropy value, the mixing function selected from a plurality of mixing functions based on the entropy value.

10. The device of claim 9, wherein determining the entropy value is alternately determined based on the non-inverse value of the entropy oscillator or the inverse of the value of the entropy oscillator.

11. The device of claim 1, wherein the bit length is between 2 and 6.

12. The device of claim 1, wherein the second linear feedback shift register is to update when the counter value equals the update value.

13. The device of claim 1, wherein the bit positions of the first linear feedback shift registers are not consecutive.

14. The device of claim 1, wherein a number of tap positions of the first linear feedback shift registers is different than the number of tap positions of the second linear feedback shift registers.

15. The device of claim 1, wherein tap positions of the first linear feedback shift registers are different than tap positions of the second linear feedback shift registers.

16. A method of generating a number, the method comprising:
incrementing a counter value;
comparing the counter value to an update value comprising bit values selected from a first linear feedback shift register;
updating a second linear feedback shift register based on the comparing; and
determining an output based on bit values of the aggregation of linear feedback shift registers.

17. The method of claim 16, further comprising seeding the counter value prior to incrementing the counter value.

18. The method of claim 17, wherein seeding the counter value includes sampling values of a plurality of oscillators.

19. The method of claim 18, further comprising seeding the first and second linear feedback shift registers with values sampled from the plurality of oscillators prior to incrementing the counter value.

20. The method of claim 19, wherein a subset of oscillators of the plurality of oscillators are associated with the second linear feedback shift register, the method further comprising seeding the counter value by sampling an oscillator of the subset of oscillators.

21. The method of claim 16, wherein updating the second linear feedback shift register includes updating when the counter value equals the update value.

22. A device comprising:
a plurality of linear feedback shift registers;
a plurality of counters, each counter to increment a counter value; and
a plurality of comparators, each comparator to compare the counter value of a corresponding counter to bit values selected from a corresponding first associated linear feedback shift register of the plurality of linear feedback shift registers, an output of the each comparator to initiate an update of a second corresponding linear feedback shift register of the plurality of linear feedback shift registers based on the comparison.

23. The device of claim 22, further comprising a plurality of oscillators, each oscillator of the plurality of oscillators uniquely associated with a bit position of the plurality of linear feedback shift registers.

24. The device of claim 22, further comprising a mixing module coupled to the plurality of linear feedback shift registers, the mixing module to determine a number based on the plurality of linear feedback shift registers.

25. The device of claim 24, further comprising an entropy oscillator and an entropy module coupled to the entropy oscillator and the mixing module, the entropy module to determine an entropy value based on a value of the entropy oscillator.

26. The device of claim 25, wherein the entropy module is to determine the entropy value as alternately the value of the entropy oscillator or the inverse of the value of the entropy oscillator.

27. The device of claim 26, wherein the mixing module determines the number based on a mixing function, the mixing function selected from a plurality of mixing functions based on the entropy value.

28. A method of generating a number, the method comprising:
incrementing counter values of a plurality of counter values;
determining a plurality of update values, each update value comprising bit values selected from a uniquely associated source linear feedback shift register of a plurality of linear feedback shift register, each update value uniquely associated with a counter of the plurality of counters;
comparing each update value with the value of the uniquely associated counter;
updating the plurality of linear feedback shift registers, each counter uniquely associated with an update linear feedback shift register, wherein the uniquely associated update linear feedback shift register updates based on the comparing; and
determining the number based on bit values of the plurality of linear feedback shift registers.

* * * * *